(12) United States Patent
Okuhata

(10) Patent No.: US 9,503,296 B2
(45) Date of Patent: Nov. 22, 2016

(54) FM RECEIVER AND FM RECEIVING METHOD FOR RECEIVING FM SIGNAL

(71) Applicant: JVC KENWOOD Corporation, Yokohama-shi, Kanagawa (JP)

(72) Inventor: Yasuhide Okuhata, Yokohama (JP)

(73) Assignee: JVC KENWOOD CORPORATION, Yokohama-Shi, Kanagawa (JP)

(*) Notice: Subject to any disclaimer, the term of this patent is extended or adjusted under 35 U.S.C. 154(b) by 0 days.

(21) Appl. No.: 14/991,963

(22) Filed: Jan. 10, 2016

(65) Prior Publication Data

US 2016/0218901 A1   Jul. 28, 2016

(30) Foreign Application Priority Data

Jan. 26, 2015 (JP) ................... 2015-012458

(51) Int. Cl.
*H04L 25/06* (2006.01)
*H04L 25/10* (2006.01)
*H04L 27/14* (2006.01)

(52) U.S. Cl.
CPC ............. *H04L 27/142* (2013.01); *H04L 25/06* (2013.01)

(58) Field of Classification Search
CPC ..... H04L 27/142; H04L 27/22; H04L 27/38; H04L 25/06
See application file for complete search history.

(56) References Cited

U.S. PATENT DOCUMENTS

2006/0093079 A1* 5/2006 Kim ................ H04L 25/062
375/344
2013/0148761 A1* 6/2013 Rao .................... H04B 1/30
375/319

FOREIGN PATENT DOCUMENTS

JP    2011-029717 A    2/2011

* cited by examiner

Primary Examiner — David B. Lugo
(74) Attorney, Agent, or Firm — Claire Zopf

(57) ABSTRACT

A quadrature detector performs a quadrature detection on an FM signal based on a local oscillation signal, and outputs a baseband signal. A first corrector and a second corrector perform a correction on the baseband signal based on a DC offset correction value. The DC offset detector performs a polar coordinate conversion on the baseband signal, and derives the DC offset value in such a way that respective amplitudes in a plurality of phase domains defined on an IQ plane approximate one another. An FM detector performs an FM detection on the corrected baseband signal, and generates a detection signal. A controller controls the frequency of the local oscillation signal in such a way that a phase component having undergone the polar coordinate conversion by the DC offset detector is rotated.

4 Claims, 4 Drawing Sheets

FM RECEIVER AND FM RECEIVING METHOD FOR RECEIVING FM SIGNAL

CROSS-REFERENCE TO RELATED APPLICATION

This application is based upon and claims the benefit of priority from the prior Japanese Patent Application No. 2015-12458, filed on Jan. 26, 2015, the entire contents of which are incorporated herein by reference.

BACKGROUND

1. Field

The present disclosure relates to a reception technology, and more specifically, to an FM receiver and an FM receiving method for receiving FM signals.

2. Description of the Related Art

A direct conversion type Frequency Modulation (FM) receiver converts an RF signal into a baseband signal by quadrature detection, and amplifies the baseband signal by an amplifier. When unnecessary Direct Current (DC) components are output by the amplifier, such DC components cause a DC offset, deteriorating the signal receiving performance of the receiver. In order to avoid such a performance deterioration, polar coordinate conversion is performed on an I-phase baseband signal and a Q-phase baseband signal to obtain an amplitude signal and a phase signal, the phase signal is mapped into four phase domains, and an average value of the amplitude signals for each phase domain is derived. Accordingly, a displacement of the baseband signal from an origin is derived. This displacement is taken as a correction value for the DC offset, and the I-phase baseband signal and the Q-phase baseband signal are corrected accordingly (see, for example, patent document 1).

[patent document 1] JP2011-29717

When a DC offset is detected by utilizing characteristics of a baseband Lissajous waveform in a constant envelope modulation scheme, and if a received signal is in an unmodulated state and the frequency thereof is identical with that of a local oscillation signal, the I-phase baseband signal and the Q-phase baseband signal take respective constant values. In addition, phase signals obtained by performing polar coordination conversion on those signals also take respective constant values, and are always mapped into a single phase domain, and thus it is difficult to distinguish the received signal and the DC offset from each other. Hence, a correction is performed in such a way that a value obtained by synthesizing the received signal with the DC offset becomes "0", and thus the corrected I-phase baseband signal and the corrected Q-phase baseband signal become "0". Hence, obtainment of a normal detection signal is difficult. In addition, when a modulation index of the received signal is small, the phase change in the I-phase baseband signal and in the Q-phase baseband signal becomes little. Accordingly, the similar phenomenon occurs.

SUMMARY

To address the aforementioned technical problem, an FM receiver according to an aspect of embodiments of the present disclosure includes: a local oscillator that outputs a local oscillation signal; a quadrature detector that performs a quadrature detection on the FM signal based on the local oscillation signal output by the local oscillator, and outputs an I-phase baseband signal and a Q-phase baseband signal; a corrector that corrects the I-phase baseband signal and the Q-phase baseband signal output by the quadrature detector based on a DC offset correction value; a DC offset detector that performs a polar coordinate conversion on the I-phase baseband signal and the Q-phase baseband signal corrected by the corrector, and derives the DC offset correction value in such a way that respective amplitudes in a plurality of phase domains defined on an IQ plane approximate one another; an FM detector that performs an FM detection on the I-phase baseband signal and the Q-phase baseband signal corrected by the corrector, and generates a detection signal; and a controller that controls a frequency of the local oscillation signal output by the local oscillator so as to rotate a phase component having undergone the polar coordinate conversion by the DC offset detector.

A second aspect of embodiments of the present disclosure is an FM receiving method. This FM receiving method includes: performing a quadrature detection on an FM signal based on a local oscillation signal output by a local oscillator, and outputting an I-phase baseband signal and a Q-phase baseband signal; performing a correction on the I-phase baseband signal and the Q-phase baseband signal based on a DC offset correction value; performing a polar coordinate conversion on the corrected I-phase baseband signal and the corrected Q-phase baseband signal, and deriving the DC offset correction value in such a way that respective amplitudes in a plurality of phase domains defined on an IQ plane approximate one another; performing an FM detection on the corrected I-phase baseband signal and the corrected Q-phase baseband signal, and generating a detection signal; and controlling a frequency of the local oscillation signal output by the local oscillator in such a way that a phase component having undergone the polar coordinate conversion in deriving the DC offset correction value is rotated.

Any combination of the aforementioned components, and conversion of expressions in the embodiments among a method, a device, a system, a non-transitory recording medium, a computer program, etc., are also advantageous as an aspect of the embodiments of the present disclosure.

DETAILED DESCRIPTION

The invention will now be described by reference to the preferred embodiments. This does not intend to limit the scope of the present invention, but to exemplify the invention.

First Embodiment

A summary will be given before describing the present disclosure in detail. A first embodiment of the present disclosure relates to a direct conversion type FM receiver. This FM receiver detects a DC offset by utilizing the characteristics of a baseband Lissajous waveform in a constant envelope modulation scheme in order to suppress a deterioration of a signal receiving performance due to DC offset components. As explained above, when a received signal is in an unmodulated state, and the frequency thereof is identical with that of a local oscillation signal, it becomes difficult to distinguish the received signal and the DC offset from each other, and the corrected I-phase baseband signal and the corrected Q-phase baseband signal become "0". In order to suppress an occasion of such a false operation, the FM receiver of this embodiment executes the following processes.

The FM receiver performs FM detection on the corrected I-phase baseband signal and the corrected Q-phase baseband signal to output a detection signal, and controls the frequency of the local oscillation signal after adding an offset to the detection signal. Hence, a frequency error equivalent to the offset remains in the frequency of the received signal and the frequency of the local oscillation signal. Accordingly, an occurrence of a circumstance in which the phase signal is held at a constant value is suppressed.

Figure 1:
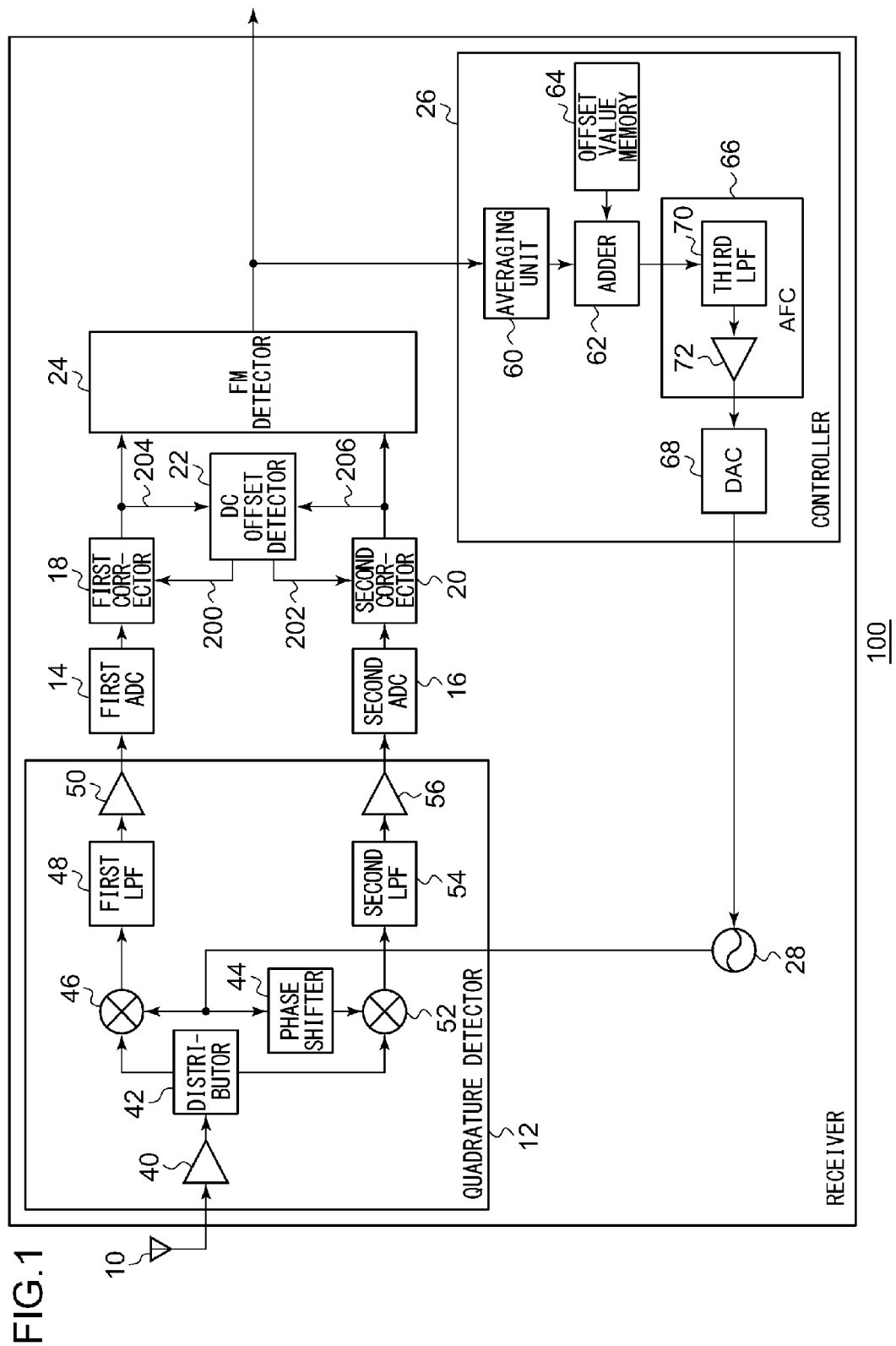
FIG. 1 is a diagram illustrating a structure of a receiver according to a first embodiment.

FIG. 1 illustrates a structure of a receiver 100 according to the first embodiment. The receiver 100 includes an antenna 10, a quadrature detector 12, a first Analog-Digital Converter (ADC) 14, a second ADC 16, a first corrector 18, a second corrector 20, a DC offset detector 22, an FM detector 24, a controller 26, and a local oscillator 28. The quadrature detector 12 includes a first amplifier 40, a distributor 42, a phase shifter 44, a first mixer 46, a first Low Pass Filter (LPF) 48, a second amplifier 50, a second mixer 52, a second LPF 54, and a third amplifier 56. The controller 26 includes an averaging unit 60, an adder 62, an offset memory 64, an Auto Frequency Controller (AFC) 66, and a Digital-Analog Converter (DAC) 68. The AFC 66 includes a third LPF 70, and a fourth amplifier 72.

The antenna 10 receives a Radio Frequency (RF) signal from an unillustrated transmitter. The RF signal has undergone an FM modulation. The antenna 10 outputs the received RF signal (hereinafter, sometimes referred to as "received signal") to the first amplifier 40. The first amplifier 40 is a Low Noise Amplifier (LNA), and amplifies the RF signal from the antenna 10. The first amplifier 40 outputs the amplified RF signal to the distributor 42. The distributor 42 divides the RF signal from the first amplifier 40 into components for two routes. The distributor 42 outputs the divided RF signal components to the first mixer 46, and the second mixer 52.

The local oscillator 28 adjusts the frequency of the local oscillation signal in accordance with a control signal from the DAC 68, and outputs the local oscillation signal with the adjusted frequency to the phase shifter 44 and the first mixer 46. In this case, the local oscillator 28 adjusts the frequency in such a way that the higher the voltage of the control signal is, the higher the frequency of the local oscillation signal becomes. The phase shifter 44 shifts the phase of the local oscillation signal from the local oscillator 28 by 90 degrees. The phase shifter 44 outputs the local oscillation signal having undergone the phase shifting to the second mixer 52.

The first mixer 46 multiplies the RF signal from the distributor 42 by the local oscillation signal from the local oscillator 28, thereby generating a baseband signal in the I phase (hereinafter, referred to as "I signal"). The first mixer 46 outputs the I signal to the first LPF 48. The second mixer 52 multiples the RF signal from the distributor 42 by the local oscillation signal from the phase shifter 44, thereby generating a baseband signal in the Q phase (hereinafter, "Q signal"). The second mixer 52 outputs the Q signal to the second LPF 54.

The first LPF 48 filtrates the I signal from the first mixer 46 to eliminate signal components with a frequency equal to or higher than a cutoff frequency, thereby performing a band limitation. The first LPF 48 outputs a low-band I signal component (hereinafter, also referred to as "I signal") to the second amplifier 50. The second LPF 54 filtrates the Q signal from the second mixer 52 to eliminate signal components with a frequency equal to or higher than a cutoff frequency, thereby performing a band limitation. The second LPF 54 outputs a low-band Q signal component (hereinafter, also referred to as "Q signal") to the third amplifier 56.

The second amplifier 50 amplifies the I signal from the first LPF 48, and the third amplifier 56 amplifies the Q signal from the second LPF 54. The I signal output by the second amplifier 50 contains unnecessary DC components, and the Q signal output by the third amplifier 56 also contains unnecessary DC components. Consequently, a DC offset voltage is added to those signals. As explained above, the quadrature detector 12 performs a quadrature detection on the RF signal. In addition, the quadrature detector 12 is constructed by analog devices, and employs, for example, a single chip structure.

The first ADC 14 performs analog-digital conversion on the I signal from the second amplifier 50. The first ADC 14 outputs the I signal converted into a digital signal (hereinafter, also referred to as "I signal") to the first corrector 18. The second ADC 16 performs analog-digital conversion on the Q signal from the third amplifier 56. The second ADC 16 outputs the Q signal converted into a digital signal (hereinafter, also referred to as "Q signal") to the second corrector 20.

Input to the first corrector 18 are the I signal output by the first ADC 14, and an I-phase offset correction value 200 from the DC offset detector 22. The first corrector 18 adds the I signal and the I-phase offset correction value 200, thereby correcting the I signal based on the I-phase offset correction value 200. The first corrector 18 outputs, as a corrected I signal 204, the I signal having undergone the correction to the DC offset detector 22, and the FM detector 24.

Input to the second corrector 20 are the Q signal output by the second ADC 16, and a Q-phase offset correction value 202 from the DC offset detector 22. The second corrector 20 adds the Q signal and the Q-phase offset correction value 202, thereby correcting the Q signal based on the Q-phase offset correction value 202. The second corrector 20 outputs, as a corrected Q signal 206, the Q signal having undergone the correction to the DC offset detector 22, and the FM detector 24.

The corrected I signal 204 from the first corrector 18, and the corrected Q signal 206 from the second corrector 20 are input to the DC offset detector 22, and the DC offset detector 22 estimates the DC offset voltage added to those signals, and generates the I-phase offset correction value 200, and the Q-phase offset correction value 202 in order to reduce the DC offset voltage. The DC offset detector 22 outputs the I-phase offset correction value 200 to the first corrector 18, and outputs the Q-phase offset correction value 202 to the second corrector 20. In this case, an explanation will be given of a structure of the DC offset detector 22 with reference to FIG. 2.

Figure 2:
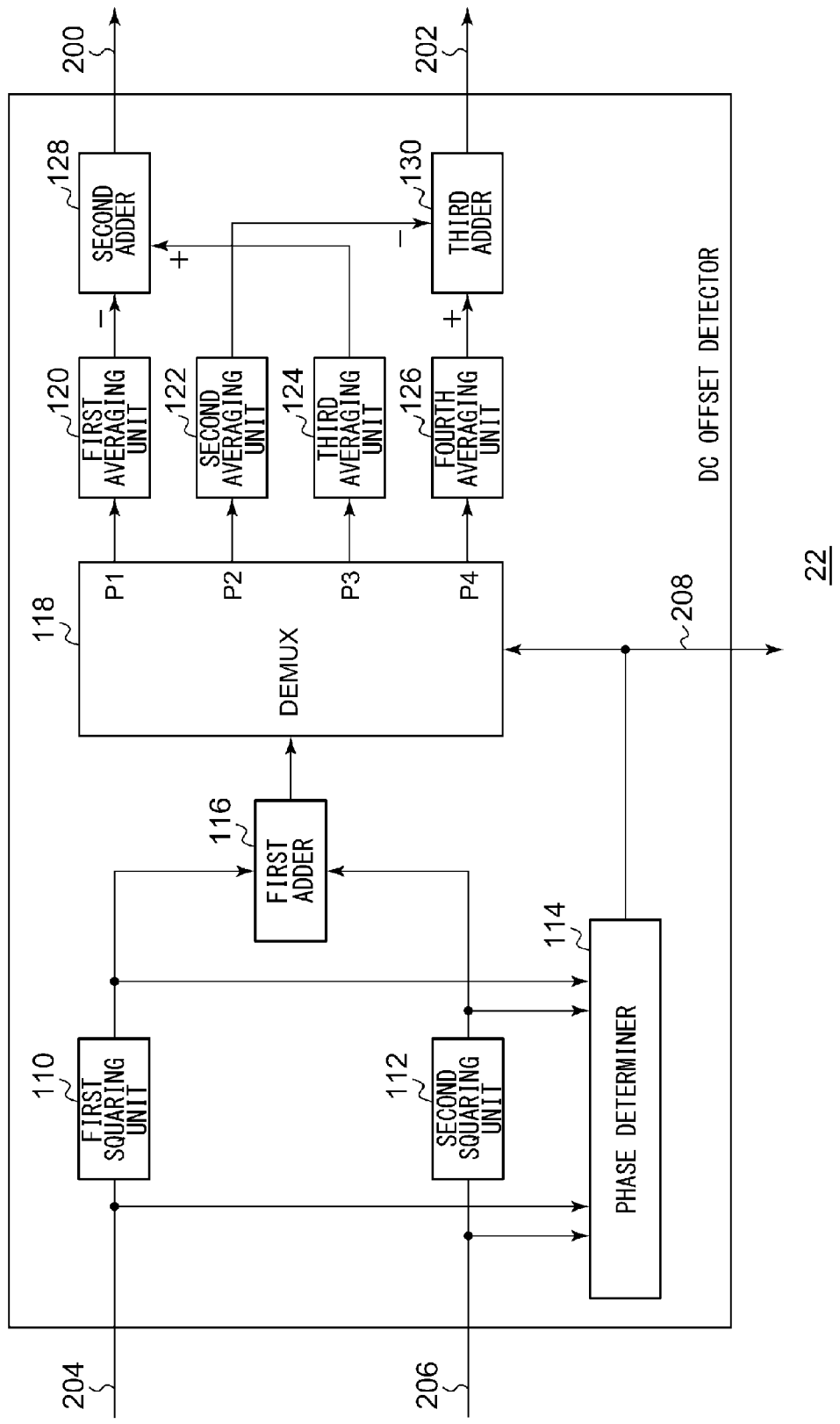
FIG. 2 is a diagram illustrating a structure of a DC offset detector in FIG. 1.

FIG. 2 illustrates a structure of the DC offset detector 22. The DC offset detector 22 includes a first squaring unit 110, a second squaring unit 112, a phase determiner 114, a first adder 116, a DEMUX 118, a first averaging unit 120, a second averaging unit 122, a third averaging unit 124, a fourth averaging unit 126, a second adder 128, and a third adder 130.

The corrected I signal 204 is input to the first squaring unit 110, and the first squaring unit 110 derives a square value of the input signal. The first squaring unit 110 outputs the square value of the corrected I signal 204 to the phase determiner 114, and the first adder 116. The corrected Q signal 206 is input to the second squaring unit 112, and derives a square value of the input signal. The second squaring unit 112 outputs the square value of the corrected Q signal 206 to the phase determiner 114, and the first adder 116.

The square value of the corrected I signal 204 is input to the first adder 116 from the first squaring unit 110, and the square value of the corrected Q signal 206 is also input to the first adder 116 from the second squaring unit 112. The first adder 116 adds the square value of the corrected I signal 204 and the square value of the corrected Q signal 206. An addition result is a power value P of the corrected I signal 204 and the corrected Q signal 206. The power value P is a square value of an amplitude signal obtained when polar coordinate conversion is performed on the corrected I signal 204 and the corrected Q signal 206. Hence, processes by the first squaring unit 110, the second squaring unit 112, and the first adder 116 correspond to a process of deriving the amplitude signal. The first adder 116 outputs the power value P to the DEMUX 118.

Figure 3:
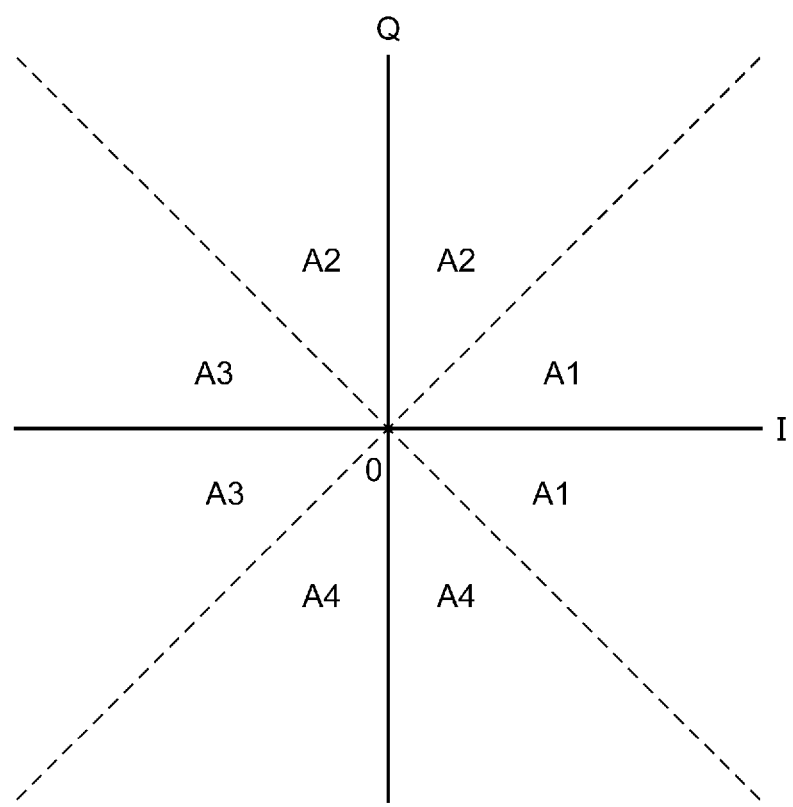
FIG. 3 is a diagram illustrating multiple domains defined in a phase determiner in FIG. 2.

Input to the phase determiner 114 are the corrected I signal 204, the corrected Q signal 206, the square value of the corrected I signal 204 from the first squaring unit 110, and the square value of the corrected Q signal 206 from the second squaring unit 112. The phase determiner 114 identifies a phase domain based on those input values. How to identify a phase domain will now be explained with reference to FIG. 3. FIG. 3 illustrates multiple domains defined in the phase determiner 114. This is an IQ plane, and the horizontal axis represents an I axis, while the vertical axis represents a Q axis. As illustrated in the figure, the four phase domains from A1 to A4 are defined so as not to overlap with adjacent domains. In this case, the phase domain A1 is a $\pi/2$ range from $7\pi/4$ to $\pi/4$, and the phase domain A2 is a $\pi/2$ range from $\pi/4$ to $3\pi/4$. In addition, the phase domain A3 is a $\pi/2$ range from $3\pi/4$ to $5\pi/4$, and the phase domain A4 is a $\pi/2$ range from $5\pi/4$ to $7\pi/4$.

In the following explanation, in order to clarify a notation, the corrected I signal 204, the corrected Q signal 206, the square value of the corrected I signal 204, and the square value of the corrected Q signal 206 are defined as "I", "Q", "$I^2$", and "$Q^2$", respectively. The phase determiner 114 maps the phase signal into the four phase domains A1, A2, A3, and A4 based on the following determination conditions:

$I^2 \geq Q^2$, $I \geq 0$;   A1

$I^2 < Q^2$, $Q \geq 0$;   A2

$I^2 \geq Q^2$, $I < 0$;   A3 and $I^2 < Q^2$, $Q < 0$.   A4

The phase determiner 114 outputs the identified phase domain as a phase domain signal 208. When, for example, the identified phase domain sequentially changes like A1, A2, A3, A4, A1, and A2, etc., as time proceeds, the phase domain signal 208 likewise changes sequentially, such as A1, A2, A3, A4, A1, and A2. Such a process by the phase determiner 114 corresponds to a process of deriving the phase signal when a polar coordinate conversion is performed on the corrected I signal 204 and the corrected Q signal 206. The explanation now returns to FIG. 2.

Input sequentially to the DEMUX 118 are the power value P from the first adder 116, and the phase domain signal 208 from the phase determiner 114. Note that the power value P and the phase domain signal 208 are synchronized with each other. The DEMUX 118 adjusts the power value P into any of power values P1 to P4 in accordance with the phase domain indicated by the phase domain signal 208. This will be explained in more detail. When the phase domain signal 208 indicates the phase domain A1, the phase domain A2, the phase domain A3, or the phase domain A4, the DEMUX 118 outputs the power value P1, the power value P2, the power value P3, or the power value P4, respectively.

The first averaging unit 120 calculates an average power P1 of the input power value P1 during a predetermined time period, and outputs the average power P1 to the second adder 128. As for the averaging operation, for example, moving average is applied. The second averaging unit 122 calculates an average power P2 of the input power value P2 during a predetermined time period, and outputs the average power P2 to the third adder 130. The third averaging unit 124 calculates an average power P3 of the input power value P3 during a predetermined time period, and outputs the average power P3 to the second adder 128. The fourth averaging unit 126 calculates an average power P4 of the input power value P4 during a predetermined time period, and outputs the average power P4 to the third adder 130. The processes by the first averaging unit 120 to the fourth averaging unit 126 correspond to a deriving operation of the average value of the amplitude signal for each phase domain.

Input to the second adder 128 are the average power P1 from the first averaging unit 120, and the average power P3 from the third averaging unit 124. The second adder 128 subtracts the average power P1 from the average power P3. The second adder 128 outputs the subtraction result as the I-phase offset correction value 200. Input to the third adder 130 are the average power P2 from the second averaging unit 122, and the average power P4 from the fourth averaging unit 126. The third adder 130 subtracts the average power P2 from the average power P4. The third adder 130 outputs the subtraction result as the Q-phase offset correction value 202. As explained above, the DC offset detector 22 obtains a displacement of the corrected I signal 204 and that of the corrected Q signal 206 from the origin based on an average of the power values for each phase domain, i.e., an average of the values equivalent to the amplitude signal, and outputs the obtained displacement as the I-phase offset correction value 200, and the Q-phase offset correction value 202. This corresponds to deriving the I-phase offset correction value 200 and the Q-phase offset correction value 202 in such a way that respective amplitudes in the multiple phase domains defined on the IQ plane approximate one another. The explanation now returns to FIG. 1.

The FM detector 24 performs an FM detection on the corrected I signal 204 and the corrected Q signal 206, i.e., the baseband signals with a DC offset having undergone the correction. An example FM detection scheme is Arctan detection. According to the Arctan detection, the corrected I signal 204 and the corrected Q signal 206 are taken as two sides of a triangle, and the angle therebetween is derived. Since a change in angle per a unit time is an angular speed, i.e., a frequency, a demodulation for the FM modulation is enabled. The FM detector 24 outputs a detection signal that is a result of the FM detection. The output detection signal corresponds to a sound signal.

The detection signal from the FM detector 24 is input to the averaging unit 60. The averaging unit 60 averages the detection signal over a predetermined time period, thereby outputting an average voltage to the adder 62. As for the averaging operation, for example, a moving average is applied. The average voltage is proportional to a frequency difference between the center frequency of the received signal and the output frequency of the local oscillation signal. Hence, when, for example, the average voltage is "0", those frequencies are identical with each other. As explained above, when the received signal is in an unmodulated state, and those frequencies are identical with each other, the corrected I signal 204 and the corrected Q signal 206 keep taking a constant value, and thus it becomes difficult to distinguish signal components and the DC offset voltage. Consequently, the DC offset detector 22 inevitably outputs the I-phase offset correction value 200 and the Q-phase offset correction value 202 that cause the corrected I signal 204 and the corrected Q signal 206 to be "0". In order to address this problem, the following processes are executed.

The offset memory 64 stores an offset value defined beforehand. Input to the adder 62 are the offset value from the offset memory 64, and the average voltage from the averaging unit 60. The adder 62 adds the offset value to the average voltage, and outputs an addition result to the third LPF 70. When no offset value is added by the adder 62, the AFC 66 controls in such a way that the center frequency of the received signal and the frequency of the local oscillation signal become identical with each other, but since the adder 62 adds a predetermined offset value, the local oscillation signal contains a frequency offset in accordance with the offset value. This frequency offset causes the corrected I signal 204 and the corrected Q signal 206 to rotate, and thus an occurrence of a circumstance in which those signals keep taking a constant value is suppressed.

An average voltage to which the offset value is added (hereinafter, also referred to as "average voltage") and from the adder 62 is input to the third LPF 70. The third LPF 70 subjects the average voltage to a low-pass process. The third LPF 70 outputs the average voltage having undergone a low-pass process (hereinafter, also referred to as "average voltage") to the fourth amplifier 72. The fourth amplifier 72 amplifies the average voltage from the third LPF 70, thereby generating a control signal. The gain of an AFC loop is defined by the amplification operation of the fourth amplifier 72.

The DAC 68 performs digital-analog conversion on the control signal from the fourth amplifier 72, and outputs a control signal in the form of an analog signal (hereinafter, also referred to as "control signal") to the local oscillator 28. As explained above, the AFC 66 generates the control signal to control the frequency of the local oscillation signal based on the average voltage to which the offset value has been added by the adder 62, and provides a feedback control signal to the local oscillator 28. An addition of the offset value corresponds to a frequency control on the local oscillation signal output by the local oscillator 28 so as to rotate the phase component having undergone the polar coordinate conversion by the DC offset detector 22.

This structure is realizable by a CPU, a memory, and other LSIs of an arbitrarily computer from the standpoint of hardware, and is also realizable by a program loaded in the memory from the standpoint of software, but in this embodiment, functional blocks realized by the cooperative operation of those hardware and software are shown. Hence, it should be understood by a person ordinary skilled in the art that such functional blocks are realizable by only hardware, only software, or a combination thereof in various forms.

According to this embodiment, when the received signal is in an unmodulated state, and the frequency thereof is identical with that of the local oscillation signal, the frequency of the local oscillation signal is controlled in such a way that the phase component of the signal input to the DC offset detector is rotated. Hence, the phase component of the signal input to the DC offset detector is changeable. In addition, since the phase component of the signal input to the DC offset detector is changed, the DC offset detector is capable of correcting the DC offset voltage only. Still further, when the received signal is in an unmodulated state, and the frequency thereof is identical with that of the local oscillation signal, the DC offset detector corrects the DC offset voltage only. Accordingly, an occurrence of a false operation when the unnecessary DC offset components superimposed on the baseband signal are corrected is suppressed. In addition, when the received signal is in an unmodulated state, and the frequency thereof is identical with that of the local oscillation signal, the AFC controls in such a way that those frequencies do not become identical. This enables the DC offset detector to correct the DC offset voltage only. Still further, since the process simply adds the offset value to the detection signal only, the process execution is simple. Yet further, since the DC offset voltage is corrected, a deterioration of the signal receiving performance is suppressed.

Second Embodiment

Next, an explanation will be given of a second embodiment. The second embodiment relates to a direct conversion type FM receiver like the first embodiment. According to the first embodiment, in order to suppress an occurrence of a false operation when the DC offset is detected, the frequency of the local oscillation signal is controlled after the offset is added to the detection signal. Conversely, according to the second embodiment, in order to suppress an occurrence of a false operation when the DC offset is detected, a distribution of the corrected I-phase baseband signal and the corrected Q-phase baseband signal which appear in each phase domain is monitored. When the distribution is non-uniform, the frequency of the local oscillation signal is changed. Consequently, an occurrence of a circumstance in which the phase signal keeps taking a constant value is suppressed.

Figure 4:
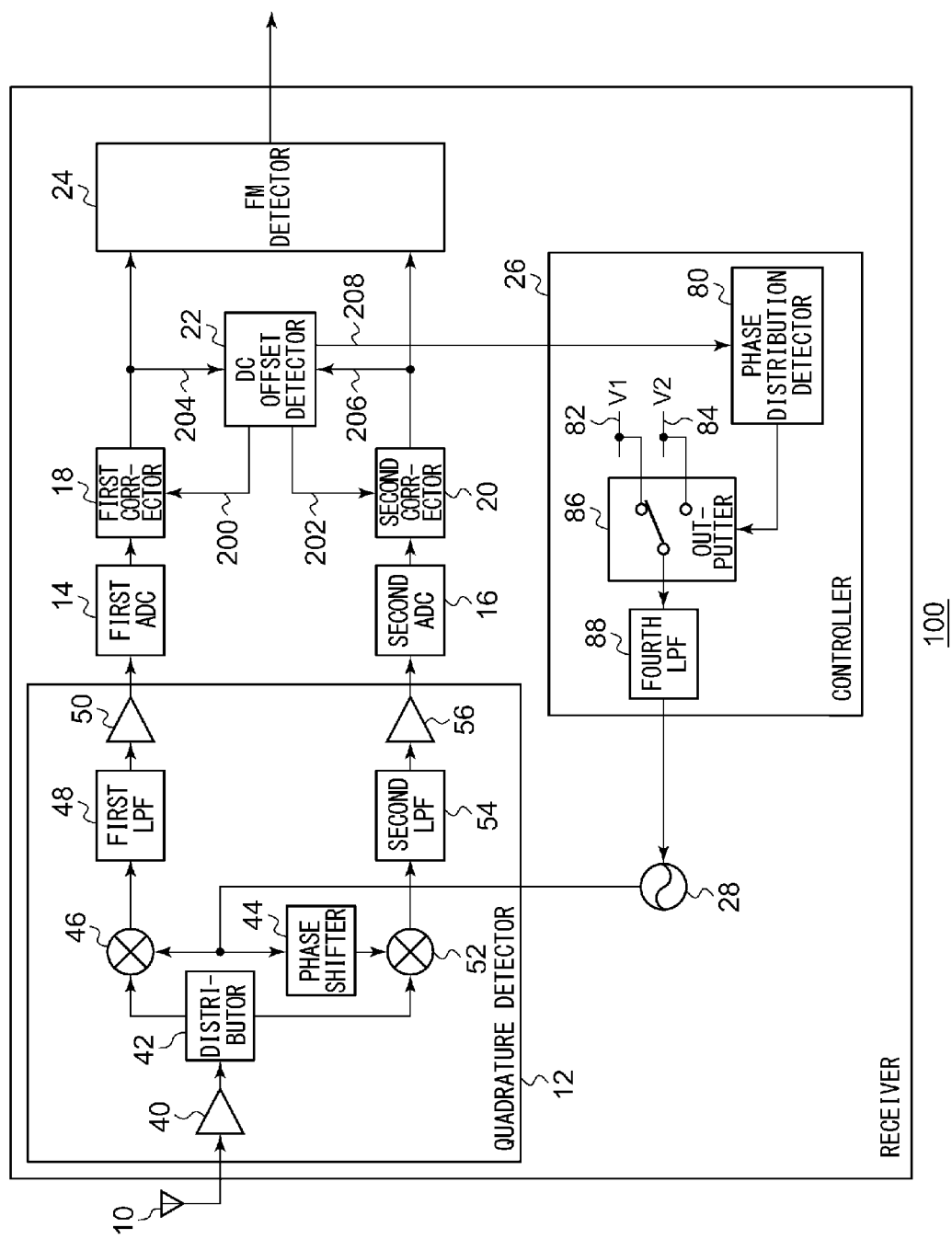
FIG. 4 is a diagram illustrating a structure of a receiver according to a second embodiment.

FIG. 4 illustrates a structure of a receiver 100 according to the second embodiment. The receiver 100 includes an antenna 10, a quadrature detector 12, a first ADC 14, a second ADC 16, a first corrector 18, a second corrector 20, a DC offset detector 22, an FM detector 24, a controller 26, and a local oscillator 28. The quadrature detector 12 is the same as the quadrature detector in FIG. 1. The controller 26 includes a phase distribution detector 80, a first power supply 82, a second power supply 84, an outputter 86, and a fourth LPF 88. In this embodiment, the difference from FIG. 1, in particular, the controller 26 will be mainly explained.

A phase domain signal 208 from the DC offset detector 22 is input to the phase distribution detector 80. As explained above, the phase domain signal 208 indicates the phase domain identified by the phase determiner 114. When the corrected I signal 204 and the corrected Q signal 206 are not held at a constant value, the phase components thereof also change. Hence, in the phase domain signal 208, each phase domain uniformly appears during a predetermined time period. Conversely, when the received signal is in an unmodulated state and the frequency thereof is identical with that of the local oscillation signal, the corrected I signal 204 and the corrected Q signal 206 become a constant value. Accordingly, in the phase domain signal 208, the same phase domains appear in series. That is, in the phase domain signal 208, the phase domain appears non-uniformly during a predetermined time period.

Hence, the phase distribution detector 80 counts the number of appearances of each phase domain indicated by the phase domain signal 208 during the predetermined time period. The phase distribution detector 80 compares the count values of the respective phase domains after the predetermined time period has elapsed, and derives the uniformity of appearance of phase components subjected to polar coordinate conversion in the plurality of phase domains. When, for example, a difference between the maximum count value and the minimum count value is smaller than a threshold, the phase distribution detector 80 determines the appearance as being uniform, and when the difference is equal to or larger than the threshold, the phase distribution detector 80 determines as non-uniform. The count value may be normalized by dividing the difference by the sum of all count values. In addition, the phase distribution detector 80 may derive a statistical value that indicates a variation like a dispersion or a standard deviation based on each count value, and when the statistical value is smaller than a threshold, the phase distribution detector 80 may determine the appearance as being uniform, and when the statistical value is equal to or larger than the threshold, the phase distribution detector 80 may determine the appearance as being non-uniform. When determining the appearance as being uniform, the phase distribution detector 80 outputs a sustain signal to the outputter 86, and when determining the appearance as being non-uniform, the phase distribution detector 80 outputs a changeover signal to the outputter 86.

The first power supply 82 supplies a predetermined first voltage to the outputter 86. The second power supply 84 supplies a second voltage that has a different value from that of the first voltage supplied from the first power supply. The second voltage may be higher or lower than the first voltage.

Input to the outputter 86 are the first voltage from the first power supply 82, and the second voltage from the second power supply 84. In addition, the sustain signal or the changeover signal is also input to the outputter 86. The outputter 86 employs a switch structure, and selects and outputs either the first voltage or the second voltage in accordance with the sustain signal or the changeover signal. First, the outputter 86 arbitrarily selects either the first voltage or the second voltage, e.g., the first voltage. In this condition, when receiving the sustain signal, the outputter 86 keeps selecting the first voltage, and thus the first voltage is continuously output to the fourth LPF 88. That is, the sustain signal is to maintain the selection operation by the outputter 86.

Conversely, when receiving the changeover signal, the outputter 86 changes the voltage to be selected from the first voltage to the second voltage, and thus the second voltage is output to the fourth LPF 88. That is, the changeover signal is a signal to change the voltage to be selected by the outputter 86. Hence, when selecting the second voltage and receiving the changeover signal, the outputter 86 changes the voltage to be selected from the second voltage to the first voltage. Accordingly, when the uniformity derived by the phase distribution detector 80 is smaller than the threshold, and is non-uniform, the outputter 86 changes the voltage to be selected between the first voltage supplied from the first power supply 82 and the second voltage supplied from the second power supply 84. The outputter 86 outputs either the first voltage or the second voltage to the fourth LPF 88.

The first voltage or the second voltage is input to the fourth LPF 88 from the outputter 86. The fourth LPF 88 executes a low-pass process on the first voltage or the second voltage. The fourth LPF 88 outputs a control signal that is a result of the low-pass process to the local oscillator 28. As explained above, the frequency of the local oscillation signal output by the local oscillator 28 is controlled based on the control signal. Consequently, since the first voltage and the second voltage are changed over, the voltage of the control signal also changes, and thus the oscillation frequency of the local oscillation signal changes. Hence, the corrected I signal 204 and the corrected Q signal 206 input to the DC offset detector 22 are not held at a constant value, enabling the DC offset detector 22 to correct the DC offset voltage only.

As explained above, when the uniformity derived by the phase distribution detector 80 is smaller than the threshold, the outputter 86 and the fourth LPF 88 change the value of the control signal for controlling the frequency of the local oscillation signal, and provide a feedback control signal to the local oscillator 28. Hence, the controller 26 of the second embodiment also controls the frequency of the local oscillation signal output by the local oscillator 28 in such a way that the phase component having undergone the polar coordinate conversion by the DC offset detector 22 is rotated.

When the antenna 10 receives no RF signal, the I signal output by the first ADC 14 and the Q signal output by the second ADC 16 only represents the DC offset voltage. Hence, the phase component having undergone the polar coordinate conversion by the DC offset detector 22 keeps taking the same value. In this case, although the oscillation frequency of the local oscillation signal output by the local oscillator 28 changes periodically, the DC offset voltage remains the same. This enables the DC offset detector 22 to operate so as to cancel the DC offset voltage.

According to this embodiment, when the phase distribution becomes non-uniform, the value of the control signal is changed, and thus the frequency of the local oscillation signal can be changed. In addition, since the frequency of the local oscillation signal changes, even if such a frequency has been identical with that of the received signal up to this moment, both frequencies can have different values from each other. Still further, since the frequency of the local oscillation signal and that of the received signal are different from each other, the DC offset detector is capable of correcting the DC offset voltage only. Yet further, when the received signal is in an unmodulated state, and the frequency thereof is identical with that of the local oscillation signal, the DC offset detector corrects the DC offset voltage only, suppressing an occurrence of a false operation when the unnecessary DC offset components superimposed on the baseband signal are corrected. In addition, when the uniformity of the phase components is lower than a threshold, only the selection of either the first voltage or the second voltage is changed so that the process is simplified.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An FM receiver comprising:
   a local oscillator that outputs a local oscillation signal;
   a quadrature detector that performs a quadrature detection on the FM signal based on the local oscillation signal output by the local oscillator, and outputs an I-phase baseband signal and a Q-phase baseband signal;
   a corrector that corrects the I-phase baseband signal and the Q-phase baseband signal output by the quadrature detector based on a DC offset correction value;
   a DC offset detector that performs a polar coordinate conversion on the I-phase baseband signal and the Q-phase baseband signal corrected by the corrector, and derives the DC offset correction value in such a way that respective amplitudes in a plurality of phase domains defined on an IQ plane approximate one another;
   an FM detector that performs an FM detection on the I-phase baseband signal and the Q-phase baseband signal corrected by the corrector, and generates a detection signal; and
   a controller that controls a frequency of the local oscillation signal output by the local oscillator so as to rotate a phase component having undergone the polar coordinate conversion by the DC offset detector.

2. The FM receiver according to claim 1, wherein the controller comprises:
   a phase distribution detector that derives a uniformity when the phase component having undergone the polar coordinate conversion by the DC offset detector appears in each of the plurality of phase domains; and
   an outputter that changes a value of a control signal to control the frequency of the local oscillator when the uniformity derived by the phase distribution detector is smaller than a threshold, and provides a feedback control signal to the local oscillator.

3. The FM receiver according to claim 2, further comprising:
   a first power supply that supplies a first voltage; and
   a second power supply that supplies a second voltage which has a different value from a value of the first voltage supplied from the first power supply,
   wherein when the uniformity derived by the phase distribution detector is smaller than the threshold, the outputter changes a selection of either the first voltage supplied from the first power supply and the second voltage supplied from the second power supply to an other voltage.

4. An FM receiving method comprising:
   performing a quadrature detection on an FM signal based on a local oscillation signal output by a local oscillator, and outputting an I-phase baseband signal and a Q-phase baseband signal;
   performing a correction on the I-phase baseband signal and the Q-phase baseband signal based on a DC offset correction value;
   performing a polar coordinate conversion on the corrected I-phase baseband signal and the corrected Q-phase baseband signal, and deriving the DC offset correction value in such a way that respective amplitudes in a plurality of phase domains defined on an IQ plane approximate one another;
   performing an FM detection on the corrected I-phase baseband signal and the corrected Q-phase baseband signal, and generating a detection signal; and
   controlling a frequency of the local oscillation signal output by the local oscillator in such a way that a phase component having undergone the polar coordinate conversion in deriving the DC offset correction value is rotated.

* * * * *